US007953625B2

(12) United States Patent
Hirschenberger et al.

(10) Patent No.: US 7,953,625 B2
(45) Date of Patent: May 31, 2011

(54) AVAILABLE RESOURCE PRESENTATION

(75) Inventors: Stefan Hirschenberger, Walldorf (DE); Hermann Weinmann, Angelbachtal (DE)

(73) Assignee: SAP Aktiengesellschaft, Walldorf (DE)

( * ) Notice: Subject to any disclaimer, the term of this patent is extended or adjusted under 35 U.S.C. 154(b) by 3218 days.

(21) Appl. No.: 10/284,023

(22) Filed: Oct. 29, 2002

(65) Prior Publication Data

US 2004/0098290 A1 May 20, 2004

(51) Int. Cl.
*G06F 11/34* (2006.01)
(52) U.S. Cl. ...................... 705/7.39; 705/7.25
(58) Field of Classification Search ................. 705/8, 11
See application file for complete search history.

(56) References Cited

U.S. PATENT DOCUMENTS

| | | | |
|---|---|---|---|
| 4,937,743 A * | 6/1990 | Rassman et al. ................... 705/8 |
| 5,537,524 A | 7/1996 | Aprile | |
| 5,661,918 A | 9/1997 | Malcolm et al. | |
| 5,890,131 A | 3/1999 | Ebert et al. | |
| 5,907,490 A * | 5/1999 | Oliver ............................. 700/90 |
| 5,991,728 A * | 11/1999 | DeBusk et al. .................... 705/2 |
| 6,023,702 A | 2/2000 | Leisten et al. | |
| 6,097,390 A | 8/2000 | Marks | |
| 6,282,514 B1 | 8/2001 | Kumashiro | |
| 6,351,734 B1 * | 2/2002 | Lautzenheiser et al. .......... 705/8 |
| 6,397,202 B1 | 5/2002 | Higgins et al. | |
| 6,574,587 B2 * | 6/2003 | Waclawski .................... 702/186 |
| 6,854,088 B2 | 2/2005 | Massengale et al. | |
| 7,478,051 B2 * | 1/2009 | Nourbakhsh et al. ............. 705/9 |
| 2001/0032155 A1 | 10/2001 | Groat et al. | |
| 2002/0022985 A1 * | 2/2002 | Guidice et al. .................. 705/10 |
| 2002/0194114 A1 * | 12/2002 | Erdmier ........................... 705/37 |
| 2003/0009401 A1 * | 1/2003 | Ellis ................................. 705/35 |
| 2003/0018503 A1 * | 1/2003 | Shulman ........................... 705/7 |
| 2003/0050871 A1 * | 3/2003 | Broughton ....................... 705/28 |
| 2003/0090509 A1 * | 5/2003 | Tetambe et al. ............... 345/738 |
| 2003/0135481 A1 | 7/2003 | Helmes et al. | |
| 2003/0137541 A1 | 7/2003 | Massengale et al. | |
| 2003/0225738 A1 * | 12/2003 | Ternoey et al. .................... 707/1 |
| 2004/0030590 A1 * | 2/2004 | Swan et al. ........................ 705/7 |
| 2004/0138944 A1 * | 7/2004 | Whitacre et al. ................ 705/11 |
| 2004/0172322 A1 * | 9/2004 | Tenorio ........................... 705/10 |

FOREIGN PATENT DOCUMENTS

| | | |
|---|---|---|
| JP | 4 141767 | 5/1992 |
| WO | WO 95/24114 | 9/1995 |
| WO | WO 95/30203 | 11/1995 |
| WO | WO 01/59582 | 8/2001 |

OTHER PUBLICATIONS

Katzenbach, John, "The Work of Teams", Harvard Business, 1998, pp. 54-57 & 62-64, retrieved from: Google Books.*
Ergometrics, www.ergometrics.com, 2000-2001, pp. 1-84, retrieved from: Google.com and archive.org.*
"The Team Dashboard", Harvard Business Review, May/Jun. 1994, pp. 1-3.*

(Continued)

Primary Examiner — Beth V Boswell
(74) Attorney, Agent, or Firm — Fish & Richardson P.C.

(57) ABSTRACT

A computer-implemented method of representing the availability of resources allocated to an entity includes receiving a planned resource description describing how resources were expected to be consumed by the entity, receiving a consumed resource description describing how resources are actually being consumed by the entity, and generating a graphic representation indicating a correlation between the planned resource description and the consumed resource description.

18 Claims, 4 Drawing Sheets

OTHER PUBLICATIONS

"Interactive graphical user interface for PERT/CPM project tracking," IBM Technical Disclosure Bulletin, IBM Corp. New York, US, vol. 33, No. 11, pp. 274-275, Apr. 1991.

Kilponen et al., "ViCA—a WWW based tool for visualizing project status," Proceedings of the 33$^{rd}$ Hawaii International Conference on System Sciences, pp. 1-7, Jan. 4, 2000.

* cited by examiner

AVAILABLE RESOURCE PRESENTATION

BACKGROUND

This invention relates to the management of resources.

Several types of information technology systems (such as, e.g., enterprise resource management ('ERP') systems, customer relationship management ('CRM') systems, project systems, and work order management systems) allow users to allocate and control resources for entities such as projects, assets, cost centers, and orders. These systems support various functions within an organization including marketing, planning, design, manufacturing, consulting, development, and combinations thereof. These systems usually include one or more applications that run on one or more computing devices.

One class of information technology system is directed to the management of the lifecycle of an asset or a system of assets. Such systems, termed asset lifecycle management ('ALM') systems, can manage the sourcing, management, and sale of assets by a company. For example, an ALM system can identify assets and activities performed with the assets, manage installation, preventative maintenance, corrective maintenance, requests for service, and work schedules of the assets, and integrate financial information and performance statistics regarding the assets.

SUMMARY

The present invention provides methods and apparatus, including computer program products, for representing the availability of resources allocated to entities such as projects, assets, cost centers, and orders.

In general, in one aspect, the invention features a computer-implemented method of representing the availability of resources allocated to an entity. The method includes receiving a planned resource description describing how resources were expected to be consumed by the entity, receiving a consumed resource description describing how resources are actually being consumed by the entity, and generating a graphic representation indicating a correlation between the planned resource description and the consumed resource description.

The invention can be implemented to include one or more of the following advantageous features. The planned resource description can be represented in a first visual representation, and the consumed resource description can be represented in a second visual representation. Both the first visual representation and the second visual representation can be displayed in a single display panel.

The planned resource description can be represented by creating a first gauge that extends between a first wholly available position and a first wholly depleted position. The consumed resource description can be represented by creating a second gauge that extends between a second wholly available position and a second wholly depleted position.

A planned current availability of resources marker can be positioned along the first gauge. The planned current availability of resources marker can indicate the amount of resources expected to be available at a current time. An actual current availability of resources marker can be positioned along the second gauge. The actual current availability of resources marker can indicate an amount of resources actually available at the current time. The first gauge and the second gauge can be linear gauges.

The planned resource description can describe how resources were expected to be consumed in management of a lifecycle of an asset and the consumed resource description can describe how resources are actually being consumed in the management of the lifecycle of the asset. For example, the planned resource description can be a planned budget for maintenance of the asset and the consumed resource description can be expenditures for the maintenance of the asset.

The graphic representation can be generated by indicating which resources were expected to be consumed at one or more points in the entity and by indicating the resources that were actually consumed at the one or more points in the entity. The one or more points in the entity can be one or more points in time during the entity, or the one or more points the entity can be one or more points in tasks involved in the entity. The graphic representation can be generated by determining a planned current availability of resources from the planned resource description, determining an actual current availability of resources from the actual resource description, and displaying graphically the planned current availability of resources and the actual current availability of resources relative to a total amount of resources allocated to the entity. The planned current availability of resources can describe an amount of resources expected to be available at a current time. The actual current availability of resources can describe an amount of resources actually available at the current time.

The planned current availability of resources and the actual current availability can be displayed relative to a total monetary amount of resources allocated to the entity. The graphic representation can be generated by determining a consequence of an order upon the actual current availability of resources and displaying the consequence of the order relative to the actual current availability of resources. The graphic representation can be generated in a self-contained subsection of a display panel, such as, e.g., an HTML frame, a portlet, and an iView.

In general, in another aspect, a computer program product for representing the availability of resources to an entity is operable to cause a data processing apparatus to receive information regarding a consumption of resources by the entity, determine an actual cost of the entity at a current time, receive a planned resource description describing how resources were expected to be consumed by the entity, and represent graphically the correspondence between the actual cost of the entity and the planned cost of the entity in a single display panel. The planned resource description includes information regarding a planned cost of the entity at the current time. The product is tangibly embodied in an information carrier.

Implementations of this or any other aspect can include one or more of the following features. The computer program product can be operable to cause the data processing apparatus to receive information regarding the consumption of resources by the entity from two or more computer systems. The received information can regard the consumption of resources in management of the lifecycle of an asset such as, e.g., the consumption of resources by maintenance of the asset.

The computer program product can be operable to cause the data processing apparatus to receive an identification of an order and graphically represent a consequence of the order upon the actual cost of the entity. The order can be, e.g., a repair order.

The computer program product can be operable to cause the data processing apparatus to receive the planned resource description including information regarding a total amount of resources allocated to the entity, to represent one or more gauges that includes a span indicating the total amount of resources allocated to the entity, and to position a first indicator to indicate the actual cost of the entity and a second indicator to indicate the planned cost of the entity along the one or more gauge.

The computer program product can be operable to cause the data processing apparatus to position a first marker along the gauge to indicate a first amount of resources at a first point in the entity and to position a second marker along the gauge to indicate a second amount of resources at a second point in the entity. The first marker and the second marker can be positioned to indicate actual amounts of resources consumed during the entity. A third marker can be positioned along the gauge to indicate a third amount of resources at a third point in the entity. The first marker, the second marker, and the third marker can be adjacent to each other and positioned to indicate a nonuniform distribution of resources between the first point, the second point, and the third point.

Implementations of the invention can provide one or more of the following advantages. When an entity management system graphically represents the availability of resources allocated to an entity, a manager or other user is able to oversee the entity more effectively. In particular, many entities can be complex. For example, projects can involve several different participants expending resources in several different departments using several different technologies. A project manager may lack the expertise, the information, or the time needed to sort through reports of resource expenditure from the different aspects of the project, and to compare the total resource expenditure with a planned resource expenditure. A graphical representation of the availability of resources to an entity thus highlights resource expenditure to a manager. This affords the manager the opportunity to identify potential over-consumption of resources in a very early phase as an integral part of the planning/control process.

In terms of asset lifecycle management, a graphical representation of the availability of resources for the management of the lifecycle of an asset highlights the performance of the asset to a user. In particular, for example, a user can easily see if a particular asset has required exceptional maintenance during its lifecycle and make decisions regarding the profitability of future maintenance. Also, when a user is able to easily identify individual assets or specific times when assets have required exceptional outlays of resources, the user can more easily determine the source of this exceptional behavior.

By graphically representing actual costs and planned costs of the entity on one screen, a system highlights discrepancies between the actual costs and planned costs to a user such as an entity manager. This one screen graphical representation facilitates entity management by the user and allows to user to quickly grasp this relevant financial information without resorting to reading and analyzing alphanumeric representations of costs.

Moreover, since actual costs and projected costs are graphically shown on one screen, a manager or other user is able to easily ascertain the correlation between of projected costs and actual costs of the entity. Information from different departments and different computer systems can be synthesized into an easily understood graphical display. The user can use this display to make decisions regarding, e.g., whether an entity is to proceed or is to modified because of the state of resource consumption by the entity.

By including either or both of task information and time information in a graphical display of projected costs and actual costs, a user such as an entity manager is able to visually ascertain the correspondence between tasks, time, and resources. In particular, a user is able to observe if the rate of resource depletion is in accordance with expectations, and monitor the rate of resource depletion for the tasks that form an entity or for the periods of time that the entity occupies.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
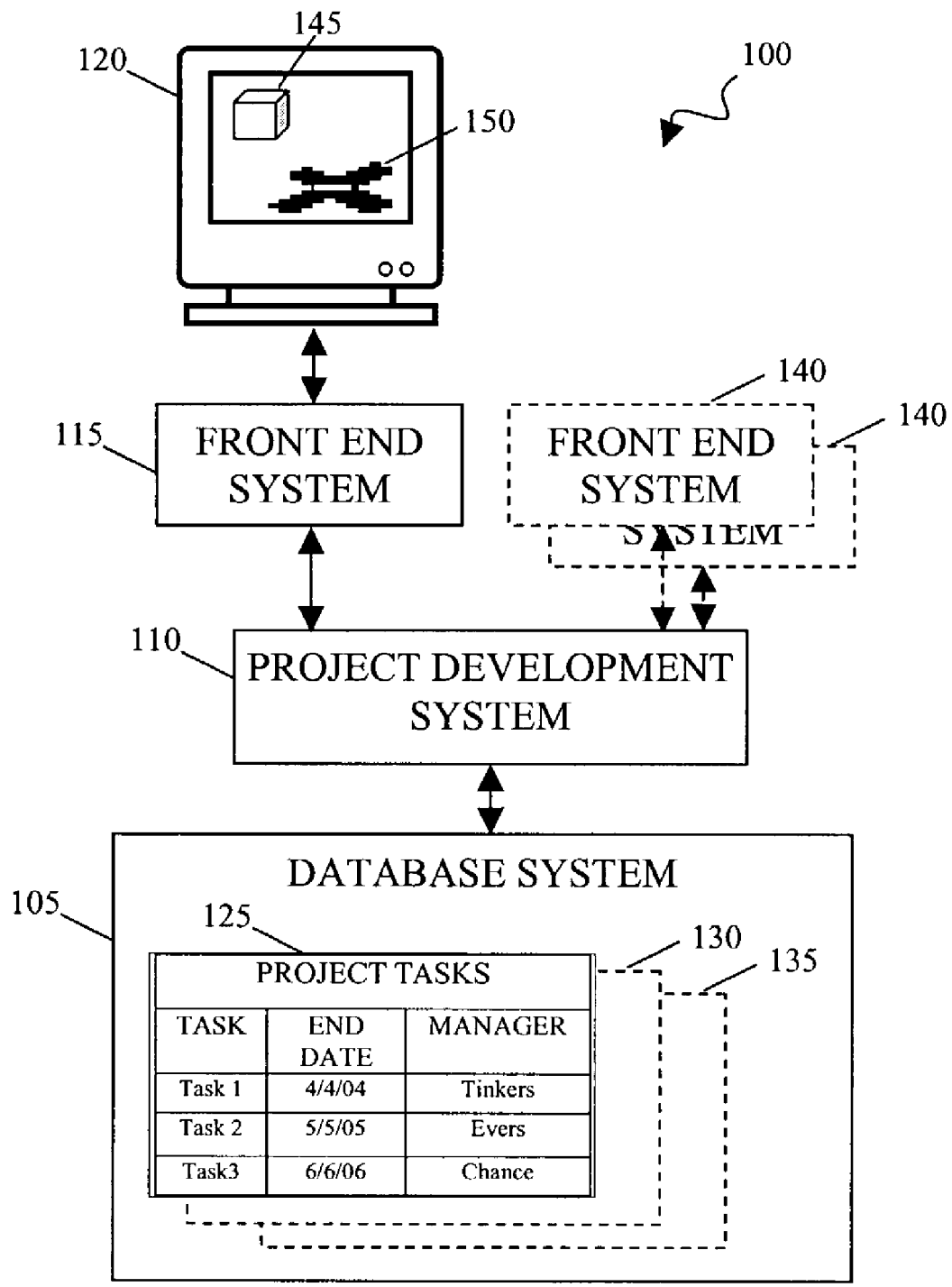
FIG. 1 shows a system for representing the availability of resources to an entity.

As shown in FIG. 1, a system 100 for representing the availability of resources in a budget includes a database system 105, an entity management system 110, a front end system 115, and a graphical output device such as a monitor 120. Database system 105 stores a collection of objects 125, 130, 135 or other data that describe an entity and the resources, such as money, available to the entity. Objects 125, 130, 135 can include data that describes the actual resources available to the entity and planned resources available to the entity. For example, objects 125, 130, 135 can describe the actual budget and the planned budget for asset lifecycle management.

Entity management system 110 is an application that stores and executes an entity management application. Entity management system 110 accesses objects 125, 130, 135 while executing the entity management application to develop and manage the entity. For example, entity management system 110 can access objects 125, 130, 135 to determine the resources allocated to the entity.

Front end system 115 communicates with entity management system 110 during execution of the entity management application. For example, front end system 115 can receive, using, e.g., either a push or a pull mechanism, information and instructions for graphically representing availability of resources in the entity budget on monitor 120.

System 100 can be part of entity management system 110 and can also include one or more additional front end systems 140 that communicate with entity management system 110 during execution of the entity management application. For example, front end systems 140 can provide information to entity management system 110 that updates the status of the entity as, e.g., potential and previous expenditures, completed tasks, and milestones reached. Entity management system 110 incorporates this information into objects 125, 130, 135. The description of the entity at database system 105 thus dynamically changes in time, and the changes are dynamically and graphically displayed for a user by front end system 115 on monitor 120.

In particular, the representation of the entity on monitor 120 can include a graphical representation of the structure of the entity 145 and a graphical representation of the availability of resources in the entity budget 150. The structure of the entity 145 and the availability of resources in the entity budget 150 can be displayed, e.g., in one or more graphic representations that may or may not include text information. The graphic representation that represents the availability of resources in the entity budget 150 can change dynamically, for example, in real time, to represent the changes in the description of the entity stored at database system 105 and received from front end systems 140. Moreover, as discussed further below, the graphic representation that indicates the availability of resources in the entity budget 150 can graphically display actual costs and planned costs on one screen.

Figure 2:
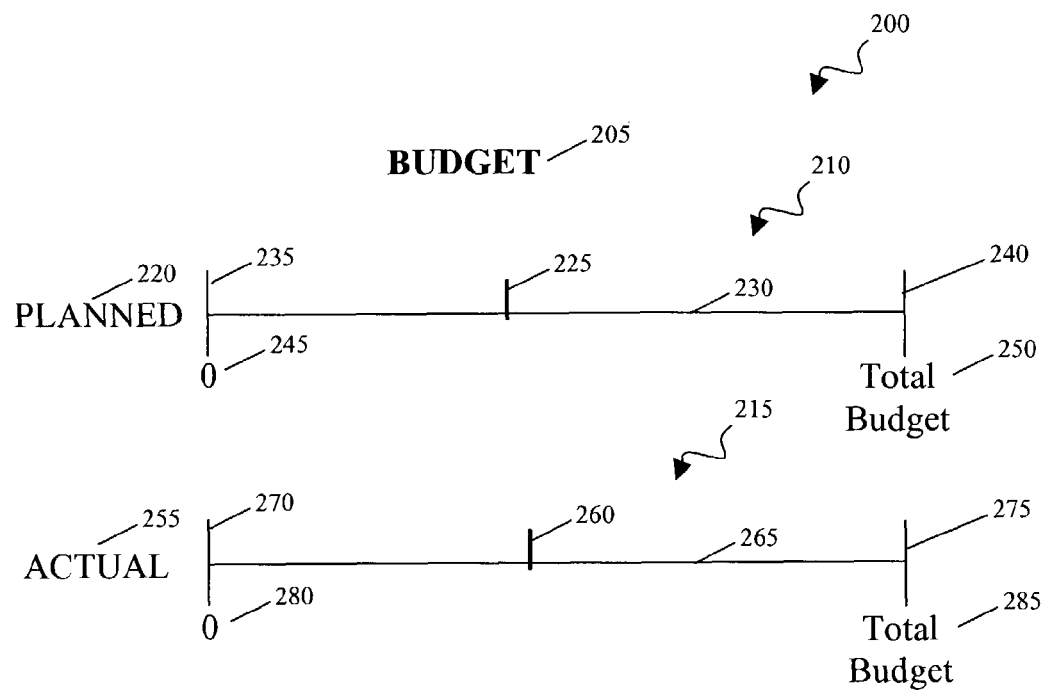
FIGS. 2-6 show example presentations of the availability of resources to an entity.

For example, as shown in FIG. 2, the availability of resources to an entity can be presented to a user using a representation 200. Representation 200 can occupy all or a portion of a display panel and includes a header 205, a projected availability display 210, and an actual availability display 215. Header 205 includes an alphanumeric string that identifies representation 200 as a graphical display of the availability of resources.

Projected availability display 210 presents the projected availability of resources to a user. The projected availability of resources can be obtained, e.g., from an entity budget or other entity plan that is designed to project the consumption of resources allocated to the entity. The consumption can be projected, e.g., as a function or time or as a function of progress toward completion of the entity. Projected availability display 210 includes a label 220, a planned availability indicator 225, and a gauge 230. Gauge 230 extends from a wholly available mark 235 to a wholly depleted mark 240. Wholly available mark 235 includes a mark label 245 such as, e.g., "Total Budget" and wholly depleted mark 240 includes a mark label 250, such as, e.g., "0."

In operation, a data processing and display system such as, e.g., system 100, graphically displays representation 200 to a user and repositions planned availability indicator 225 with respect to gauge 230 to visually display the projected availability of resources at, e.g., the current time or the current stage of the entity. In particular, system 100 translates indicator 225 from wholly available mark 235 toward wholly depleted mark 240 as the entity commences, progresses, and ends.

Actual availability display 215 presents the actual availability of resources to a user. The actual availability of resources can be obtained, e.g., from data received from multiple departments or computer systems (such as, e.g., a separate accounting system or one or more of front end systems 140) to reflect the actual consumption of resources allocated to the entity. Actual availability display 215 includes a label 255, an actual availability indicator 260, and a gauge 265. Gauge 265 extends from a wholly available mark 270 to a wholly depleted mark 275. Wholly available mark 270 includes a mark label 280 such as, e.g., "Total Budget" and wholly depleted mark 275 includes a mark label 285 such as, e.g., "0".

In operation, a data processing and display system such as, e.g., system 100, repositions actual availability indicator 260 with respect to gauge 265 to visually display the actual availability of resources at, e.g., the current time or the current stage of the entity. In particular, system 100 translates indicator 260 from wholly available mark 270 toward wholly depleted mark 275 as resources are actually consumed by the entity.

The data processing and display system can include additional functionality that facilitates the indication of the correlation between actual costs at the current time and projected costs at the current time. For example, the data processing and display system can create an "over budget indicator" such as, e.g., an audible alarm or a red screen when the actual costs exceed the projected costs by a threshold.

Figure 3:
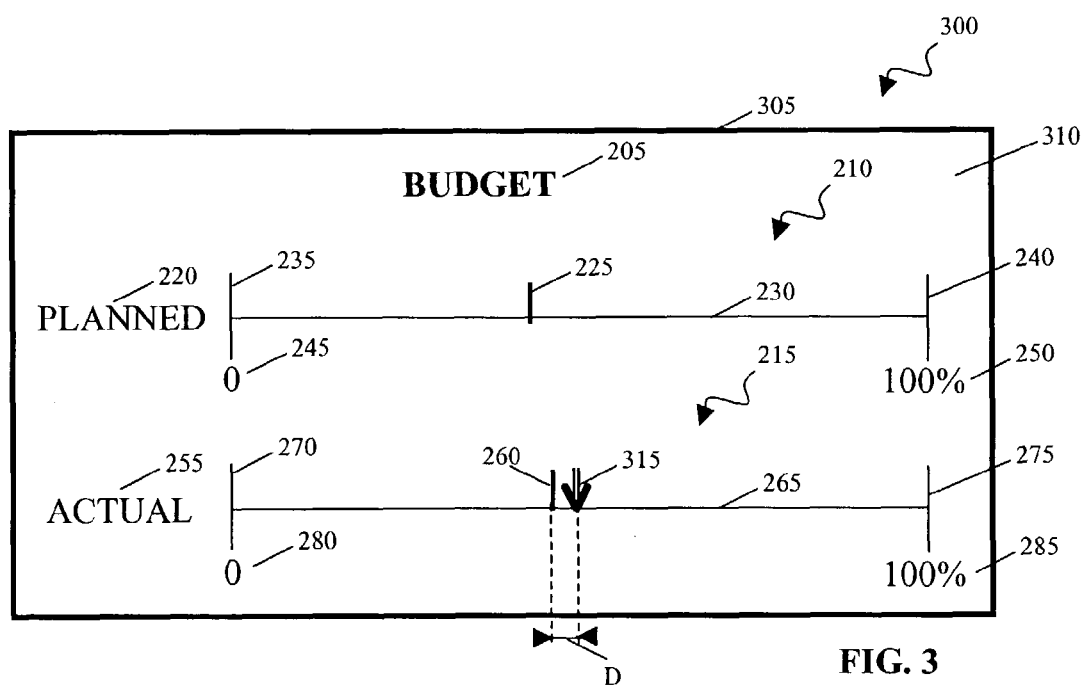

FIG. 3 shows another example of a presentation of the availability of resources to an entity, namely a representation 300. Mark labels 250, 285 include alphanumeric strings that indicate that gauges 230, 265 are denominated in terms of the percent of the allocated resources that have been theoretically of actually consumed. Furthermore, representation 300 includes a border 305 that demarcates a subsection 310 of a display panel. Subsection 310 displays a self-contained selection of resource availability content to a user. Subsection 310 can be, e.g., an HTML frame, a portlet, or an iView displayed within a display panel.

Representation 300 also includes an order consequence indicator 315. Order consequence indicator 315 is positioned along gauge 265. In operation, a data processing and display system such as, e.g., system 100, positions order consequence indicator 315 a distance D beyond actual availability indicator 260 toward wholly depleted mark 275. In this way, system 100 indicates the potential consequence of a particular order upon the resources allocated to the entity. For example, if a user is considering the submission of a repair order requisitioning the repair of a piece of equipment, system 100 can position consequence indicator 315 relative to availability indicator 260 along gauge 265 to display the consequence of the repair upon an entity budget. As another example, if a user is considering the assignment of an additional employee to a particular task, system 100 can position consequence indicator 315 to display the consequence of the assignment upon the employee-hours available to the entity.

Figure 4:
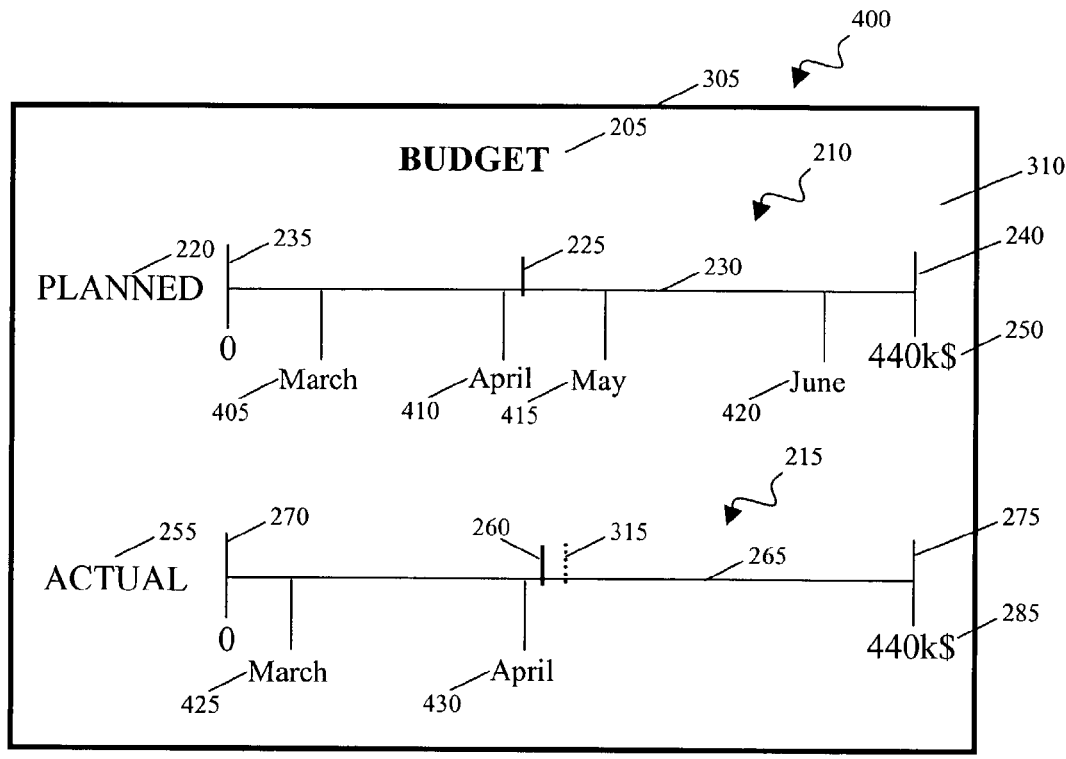

FIG. 4 shows another example of a presentation of the availability of resources to an entity, namely a representation 400. Mark labels 250, 285 include alphanumeric strings that indicate that gauges 230, 265 are denominated in terms of the monetary value of the resources that have allocated to the entity.

Projected availability display 210 includes planned time markers 405, 410, 415, 420 that are positioned opposite planned availability indicator 225 below gauge 230. Planned time markers 405, 410, 415, 420 each include an alphanumeric string that indicates a particular point in time to a user. Planned time markers 405, 410, 415, 420 thus subdivide the span of gauge 230 into time periods such as, e.g., the months of the year.

The positions of planned time markers 405, 410, 415, 420 along the span of gauge 230 indicate the projected availability of resources at the indicated point in time. For example, the position of planned time marker 405 adjacent to wholly available mark 235 indicates that the majority of resources were projected to be available at the point in time indicated by planned time marker 405. As another example, the position of planned time marker 420 adjacent to wholly depleted mark 240 indicates that the majority of resources were projected to be depleted at the point in time indicated by planned time marker 420.

In the illustrative example shown in FIG. 4, the consumption of resources is not expected to be distributed uniformly in time over the course of the entity. The nonuniform consumption is represented graphically to the user by the separation distances between planned time markers 405, 410, 415, 420 along the span of gauge 230. In particular, the separation distance between planned time marker 405 and planned time marker 410 is larger than the separation distance between planned time marker 410 and planned time marker 415, indicating that more resources were expected to be consumed in the interval between time markers 405, 410 than in the interval between time markers 415, 420.

Actual availability display 215 includes actual time markers 425, 430 that are positioned opposite actual availability indicator 260 below gauge 265. Actual time markers 425, 430 each include an alphanumeric string that indicates a particular point in time that has past to a user. Actual time markers 425, 430 thus subdivide the span of gauge 260 into past time periods such as, e.g., the previous months of the year.

The positions of actual time markers 425, 430 along the span of gauge 265 relative to the positions of corresponding planned time markers 405, 410 along the span of gauge 230 indicates the correspondence between the projected availability of resources and the actual availability of resources at the indicated points in time. For example, the separation distance between actual time marker 425 and wholly available mark 270 is smaller than separation distance between planned time marker 405 and wholly available mark 235. This indicates that more resources than projected were actually available at the point in time indicated by time markers 425, 405. As another example, the separation distance between actual time marker 430 and wholly available mark 270 is larger than separation distance between planned time marker 410 and wholly available mark 235. This indicates that fewer resources than projected were actually available at the point in time indicated by actual time markers 430, 410.

Moreover, the separation distance between actual time markers 425, 430 indicates the actual amount of resources consumed between the indicated points in time. Additional actual time markers (not shown) can also graphically indicate an actual nonuniform consumption of resources to a user.

A data processing and display system presents representation 400 to a user and repositions planned availability indicator 225 and actual availability indicator 260 to visually display the correlation between the projected costs at the current time and actual costs at the current time to a user. Moreover, the data processing and display system can include additional functionality that facilitates indicating the correlation between actual costs and projected costs at the level of individual time periods. For example, the data processing and display system can create an "over budget indicator" such as, e.g., a red portion of gauges 230, 265 for individual time periods during the entity when the difference between projected costs and actual costs exceeds a threshold. Similarly, the data processing and display system can also create an "under budget indicator" such as, e.g., a black portion of gauges 230, 265 for individual time periods during the entity when the difference between actual costs and projected costs exceeds a threshold. The data processing and display system can also visual tools such as one or more vertical lines that extend between gauges 230, 265 to demarcate the location of indicators or markers on both gauges.

Figure 5:
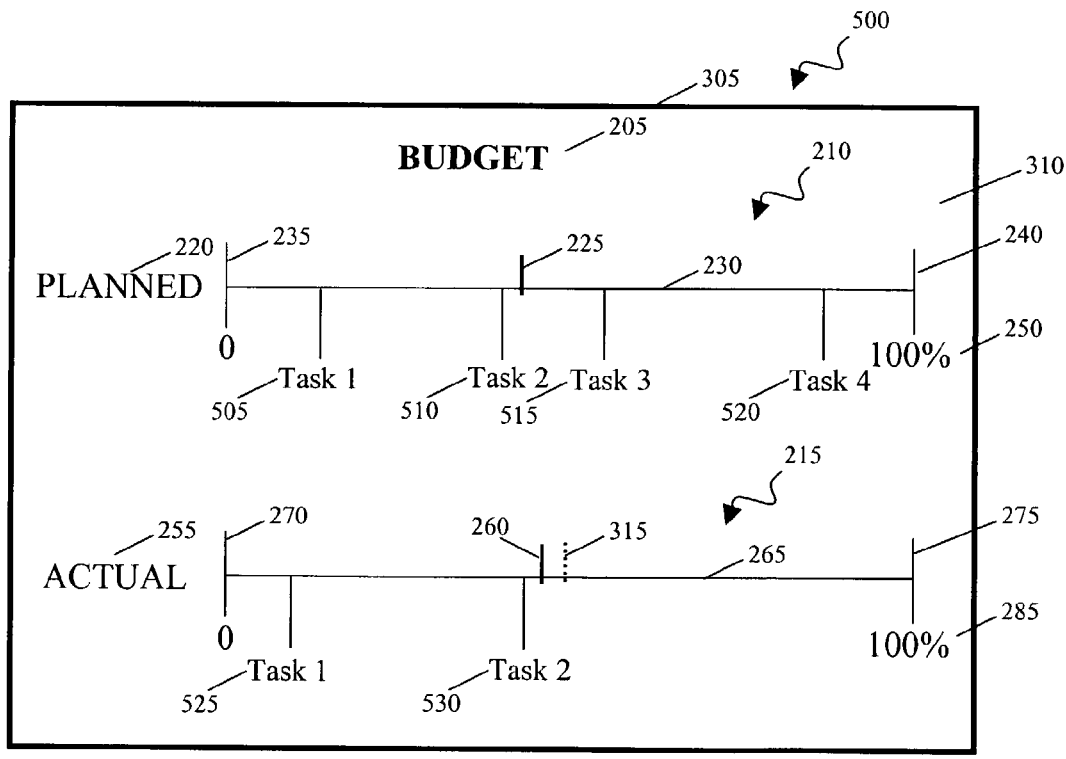

FIG. 5 shows another example of a presentation of the availability of resources to an entity, namely a representation 500. In representation 500, projected availability display 210 includes planned task markers 505, 510, 515, 520 that are positioned opposite planned availability indicator 225 below gauge 230. Planned task markers 505, 510, 515, 520 each include an alphanumeric string that indicates a particular point in the tasks (e.g., a projected start date, an actual start date, a projected end date, or an actual end date) involved in the entity to a user.

The positions of planned task markers 505, 510, 515, 520 along the span of gauge 230 thus indicate the correspondence between the projected availability of resources and the indicated points in the tasks. For example, the position of planned task marker 505 adjacent to wholly available mark 235 indicates that the majority of resources were projected to be available at the point in the task indicated by planned task marker 505. As another example, the position of planned task marker 520 adjacent to wholly depleted mark 240 indicates that the majority of resources were projected to be depleted at the point in the task indicated by planned task marker 520.

In the illustrative example shown in FIG. 5, the consumption of resources is not expected to be distributed uniformly between the indicated points in the tasks of the entity. The nonuniform consumption is represented graphically to the user by the separation distances between planned task markers 505, 510, 515, 520 along the span of gauge 230. In particular, the separation distance between planned task marker 505 and planned task marker 510 is larger than the separation distance between planned task marker 510 and planned task marker 515, indicating that more resources were expected to be consumed between the points in the tasks indicated by planned time markers 505, 510 than between the points in the tasks indicated by planned time markers 515, 520.

Actual availability display 215 includes actual task markers 525, 530 that are positioned opposite actual availability indicator 260 below gauge 265. Actual task markers 525, 530 each include an alphanumeric string that indicates a preceding point in a task to a user. Actual task markers 525, 530 thus indicate the actual resource availability in the preceding points in the tasks.

The positions of actual task markers 525, 530 along the span of gauge 265 relative to the positions of corresponding planned task markers 505, 510 along the span of gauge 230 indicates the correspondence between the projected availability of resources and the actual availability of resources at the indicated points in the tasks. For example, the separation distance between actual task marker 525 and wholly available mark 270 is smaller than separation distance between planned task marker 505 and wholly available mark 235. This indicates that more resources than projected were actually available at the point in the task indicated by task markers 525, 505. As another example, the separation distance between actual task marker 530 and wholly available mark 270 is larger than separation distance between planned task marker 510 and wholly available mark 235. This indicates that fewer resources than projected were actually available at the point in the task indicated by task markers 530, 510.

Moreover, the separation distance between actual task markers 525, 530 indicates the actual amount of resources consumed between the indicated points in the tasks. Additional actual task markers (not shown) can also graphically indicate an actual nonuniform consumption of resources to a user.

Figure 6:
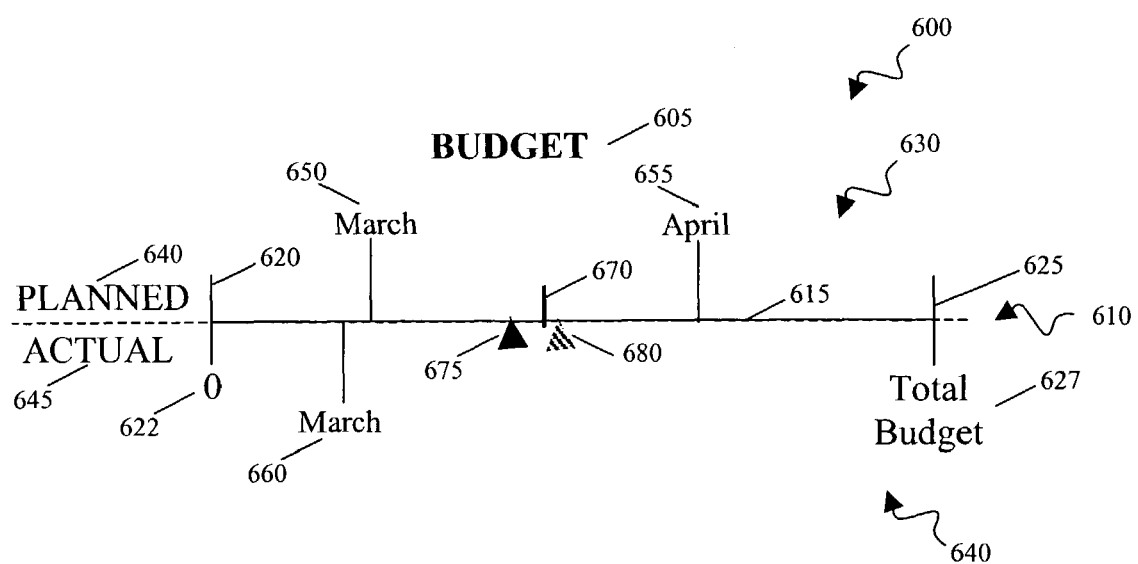

FIG. 6 shows another example of a presentation of the availability of resources to an entity, namely a representation 600. Representation 600 includes a header 605 and a combined availability display 610. Combined availability display 610 includes a single gauge 615 that extends from a wholly available mark 620 to a wholly depleted mark 625. Wholly available mark 620 includes a mark label 622 and wholly depleted mark 625 includes a mark label 627.

Gauge 615 effectively subdivides representation 600 into an upper, projected portion 630 and a lower, actual portion 635. Projected portion 630 is visually indicated to a user by a header 640, and actual portion 635 is visually indicated to a user by a header 645. Combined availability display 610 also includes planned time markers 650, 655, actual time marker 660, a planned availability indicator 670, an actual availability indicator 675, and a consequence indicator 680.

Time markers 650, 655, 660 indicate resource availability at particular points in time along the span of gauge 615. In particular, planned time markers 650, 655 indicate the expected resource availability at particular points in time. Actual time marker 660 indicates the actual resource availability at a particular point in time. The relative position of corresponding planned time markers and actual time markers along gauge 615 indicates the correspondence between the projected availability of resources and the actual availability of resources at the indicated points in time. For example, the separation distance between planned time marker 650 and wholly available mark 620 is larger than separation distance between actual time marker 660 and wholly available mark 620. This indicates that more resources than projected were actually available at the point in time indicated by time markers 650, 660.

Planned availability indicator 670, actual availability indicator 675, and consequence indicator 680 are positioned along gauge 615 to indicate the availability of resources to a user. In particular, in operation, a data processing and display system such as, e.g., system 100, presents representation 600 to a user and repositions planned availability indicator 670 with respect to gauge 615 to visually display the projected availability of resources at, e.g., the current time or the current stage of the entity. In particular, system 100 translates indicator 670 from wholly available mark 620 toward wholly depleted mark 625 as the entity commences, progresses, and ends.

Similarly, system 100 repositions actual availability indicator 675 with respect to gauge 615 to visually display the actual availability of resources at, e.g., the current time or the current stage of the entity. In particular, system 100 translates indicator 675 from wholly available mark 620 toward wholly depleted mark 625 as resources are consumed by the entity.

Additionally, system 100 positions order consequence indicator 680 beyond actual availability indicator 675 toward wholly depleted mark 625. In this way, system 100 indicates the potential consequences of a particular order upon the resources allocated to the entity.

By using gauge 615 as an index of both the planned availability of resources and the actual availability of resources, the "footprint" of representation 600 upon a display panel is reduced.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

A number of implementations of the invention have been described. Nevertheless, it will be understood that various modifications may be made. For example, planned tasks or times can be recalculated and displayed based on the current actual availability of resources. Markers can be used to indicate points in time or points in tasks on a single gauge. Actual or planned points such as milestones, decisions, and deadlines can be indicated along a gauge.

The availability of resources can be represented using other graphic representations such as bar charts, pie charts, line charts, area charts, bubble charts, and doughnut charts. The system can provide a toggle function that allows a user to toggle between graphical devices.

Accordingly, other implementations are within the scope of the following claims.

What is claimed is:

1. A method of representing the availability of a resource to an entity, the method implemented by a data processing apparatus and comprising:
receiving, at the data processing apparatus, a planned resource description describing how the resource was expected to be consumed by the entity;
receiving, at the data processing apparatus, a consumed resource description describing how the resource is actually being consumed by the entity; and
generating, by the data processing apparatus, a graphic representation indicating a correlation between the planned resource description and the consumed resource description in a single display panel, including:
displaying a first gauge that extends between a first wholly available position and a first wholly depleted position,
displaying a second gauge that extends between a second wholly available position and a second wholly depleted position,
determining an amount of the resource expected to be available at a current time from the planned resource description,
determining an amount of the resource actually available at the current time from the actual resource description,
positioning a planned current availability marker along the first gauge, the planned current availability marker indicating the amount of the resource expected to be available at the current time,
positioning an actual current availability marker along the second gauge, the actual current availability marker indicating the amount of the resource that is actually available at the current time, determining a potential consequence of a proposed order to allocate the resource in a certain way upon the actual current availability of resources, and positioning a proposed order consequence indicator along the second gauge, the order consequence indicator indicating the potential consequences of the proposed order relative to the actual current availability of the resources, wherein the first gauge and the second gauge are aligned on the single display panel for visual comparison of the positioning of the planned current availability marker and the positioning of the actual current availability marker.

2. The method of claim 1, wherein:
the first gauge comprises a first linear gauge; and
the second gauge comprises a second linear gauge.

3. The method of claim 1, wherein the entity comprises an management entity.

4. The method of claim 3, wherein:
the planned resource description comprises a planned budget for the maintenance of the asset; and
the consumed resource description comprises expenditures for the maintenance of the asset.

5. The method of claim 1, wherein generating the graphic representation comprises:
indicating which resource was expected to be consumed at one or more points along the first gauge; and
indicating which resource was actually consumed at the one or more points along the second gauge.

6. The method of claim 5, wherein the first gauge includes a collection of markers that subdivide the span of the first gauge and represent time allocated to the entity.

7. The method of claim 5, wherein the first gauge includes a collection of markers that subdivide the span of the first gauge and represent planned dates in tasks in the entity.

8. The method of claim 1, wherein the first gauge includes a label that visually represents a total monetary amount allocated to the entity.

9. The method of claim 1, wherein the graphic representation is generated in a self-contained subsection of a display panel.

10. The method of claim 9, wherein the graphic representation is generated in one of an HTML frame, a portlet, and an iView.

11. A computer program product tangibly embodied in one or more machine-readable storage devices for representing the availability of a resource to an entity, the computer program product being operable to cause a data processing apparatus to perform operations, the operations comprising:
receiving information regarding a consumption of the resource by the entity;
determining an actual cost of the entity at a current time;
receiving a planned resource description describing how the resource was expected to be consumed by the entity, the planned resource description including information regarding a planned cost of the entity at the current time and information regarding a total amount of the resource allocated to the entity; and
representing graphically a correspondence between the actual cost of the entity and the planned cost of the entity in a single display panel, including:
displaying one or more gauges that includes a span indicating the total amount of the resource allocated to the entity,
positioning a first indicator to indicate the actual cost of the entity and a second indicator to indicate the planned cost of the entity along one or more of the gauges,
receiving a description of a proposed order to allocate the cost in a certain way, and
positioning a proposed order consequence indicator along one of the gauges to graphically represent a potential consequence of the proposed order upon the actual cost of the entity.

12. The product of claim 11, wherein the computer program product is operable to cause the data processing apparatus to receive the information regarding the consumption of the resource by the entity from two or more computer systems.

13. The product of claim 11, wherein the computer program product is operable to cause the data processing apparatus to receive the information regarding the consumption of the resource to manage an asset.

14. The product of claim 13, wherein the computer program product is operable to cause the data processing apparatus to receive the information regarding the consumption of the resource to maintain the asset.

15. The product of claim 11, wherein the order comprises a repair order.

16. The product of claim 11, wherein the computer program product is operable to cause the data processing apparatus to:
position a first marker along the one or more gauges to subdivide the span of the one or more gauges and indicate a first amount of the resource at a first point in the entity; and
position a second marker along the one or more gauges to subdivide the span of the one or more gauges and indicate a second amount of the resource at a second point in the entity.

17. The product of claim 16, wherein the first marker and the second marker indicate actual amounts of the resource consumed by the entity.

18. The product of claim 16, wherein the computer program product is operable to cause the data processing apparatus to position a third marker along the one or more gauges to subdivide the span of the one or more gauges and indicate a third amount of the resource at a third point in the entity, wherein the first marker, the second marker, and the third marker are adjacent to each other and positioned to indicate a nonuniform distribution of the resource between the first point, the second point, and the third point.

* * * * *